United States Patent [19]
Hutton

[11] Patent Number: 5,868,155
[45] Date of Patent: Feb. 9, 1999

[54] VALVE MANIFOLD SYSTEM

[76] Inventor: Peter B. Hutton, c/o Century Valve & Machine Ltd., 1915-30th Avenue N.E., Calgary, Alberta, Canada, T2E 6Z5

[21] Appl. No.: 815,076

[22] Filed: Mar. 11, 1997

Related U.S. Application Data

[60] Provisional application No. 60/013,329, Mar. 13, 1996.

[51] Int. Cl.⁶ ....................................... F16K 3/36
[52] U.S. Cl. ......................... 137/240; 137/597; 137/884; 137/557
[58] Field of Search .................... 137/597, 884, 137/557, 240, 552, 594

[56] References Cited

U.S. PATENT DOCUMENTS

| | | | |
|---|---|---|---|
| 2,871,881 | 2/1959 | Hewson | 137/597 |
| 3,596,680 | 8/1971 | Adams | 137/597 |
| 4,281,683 | 8/1981 | Hetherington et al. | |
| 4,494,568 | 1/1985 | Young | |
| 4,570,674 | 2/1986 | Kaye | 137/624.18 |
| 4,672,728 | 6/1987 | Nimberger | 29/157 R |
| 4,768,543 | 9/1988 | Wienke | 137/240 |
| 4,879,912 | 11/1989 | Suckow | |
| 4,938,246 | 7/1990 | Conley et al. | 137/15 |
| 5,036,884 | 8/1991 | Miller et al. | |
| 5,277,224 | 1/1994 | Hutton et al. | |
| 5,313,985 | 5/1994 | Donner | 137/884 |
| 5,494,071 | 2/1996 | Bell | 137/597 |

FOREIGN PATENT DOCUMENTS

2086535  5/1982  United Kingdom.

OTHER PUBLICATIONS

Agco Manifolds Catalog 3000, Houston, Texas, Oct. 1980.

*Primary Examiner*—Denise L. Ferensic
*Assistant Examiner*—Ramyar Farid
*Attorney, Agent, or Firm*—Stevens, Davis, Miller & Mosher, L.L.P.

[57] ABSTRACT

A supply manifold (10) and a transmitter supporting block (11, 11a, 11b) are combined into a pressure transmitter supporting modular unit such that when maintenance or cleaning of the system is to be carried out, the pressure transmitter or transmitters can be removed together with the supporting block (11, 11a, 11b) to keep inlet section of the transmitter(s) protected from mechanical impacts or the like. The supporting block with the transmitter(s) can then be placed back after the servicing, rodding or the like of the system, without the need for time consuming realignment of the elements and without the danger of damaging the pressure transmitter as mentioned above. Three different embodiments of the supporting block (11, 11a, 11b) are described for use in the modular unit of the invention.

20 Claims, 5 Drawing Sheets

VALVE MANIFOLD SYSTEM

CROSS REFERENCE TO RELATED APPLICATIONS

This application claims priority under 35 USC 119 of provisional application Ser. No. 60/013,329, filed Mar. 13, 1996.

BACKGROUND OF THE INVENTION

The present invention relates to is a modular manifold system which has been developed to mount directly to pressure transmitters of both coplanar and biplanar types.

It is known to provide five valve manifolds with an integral body having the shape of a rectangular prism. They are typically provided with two block valves for selectively blocking or opening the input of the high and low pressure process fluid into the manifold. The high and low pressure process fluid is directed to a transmitter from which the pressure differential is monitored and transmitted. Disposed within the same body is a pair of vent valves used when it is desired to flush the ducts of the manifold with a flushing fluid usually delivered from the high or from the low pressure duct to the transmitter. With the vent valves selectively open or closed, the flow of the flushing liquid is manipulated.

Flushing of the ducts of a manifold system is an important operation in maintaining the system operative and accurate. However, after a period of operation, the length of which depends on the nature of the process fluid and other conditions, flushing is no longer sufficient and rodding (mechanical scraping) of sediments off inside walls of the passageways is required where such sediments may be difficult or impossible to remove by flushing.

An object of the present invention is to advance pressure transmitter manifold systems by producing a manifold system which allows for improved serviceability, a reduction in the number of valves required to operate the manifold system, a reduction in the number of separate components required by existing systems, a reduction in the number of potential leak points, minimizes environmental and safety hazards by allowing for the capture of toxic fluids released either through flushing of the manifold system or venting of the manifold system, improved economy and improved transmitter accuracy and response.

During the operation of differential pressure measuring installations there may be a requirement to service the orifice taps, the manifold, the passages connecting the orifice taps and the manifold or the pressure transmitter.

With respect to the pressure transmitter there may be a requirement to calibrate, test and repair the instrument. In some cases the pressure transmitter is best serviced in the controlled environment of an instrument shop, rather than in field. To accomplish this the transmitter itself, or the transmitter manifold assembly, must be removed from the field installation. The present invention is modular in nature. This permits the process fluid supply manifold to remain in service, while the support block of the manifold system, that portion directly connected to the pressure transmitter, is removed from service. The process fluid can be blocked by the process fluid supply manifold which remains in place, thus eliminating the need to provide additional block valves or to entirely shut down the process fluid flow.

The support block of the manifold system, remains connected to the pressure transmitter. This maintains the seal integrity between the pressure transmitters and the manifold, which, as some transmitter manufacturers recommend, permits precise assembly procedures and rigorous testing for the seal connection and represents a significant advantage. This seal is delicate in nature and not easily remade under field conditions. It is best left undisturbed. In the case of coplanar type transmitters, the support block also protects the delicate process isolator foils while the pressure transmitter is removed from its' installation for calibration or repair. Calibration, testing and repairs to the pressure transmitter can be conveniently carried out under controlled shop conditions, rather than in the field, with the support block attached to the transmitter.

Existing modular manifold systems were all developed for the industry standard pressure sensor spacing of 2.125" and as such could not mount directly to coplanar type transmitters with pressure sensor spacings of 1.3". The existing systems required the use of adapter flanges or plates. The present invention eliminates the need for such adapter components, thereby reducing the number of components and potential leak points.

The connection between the process fluid supply manifold and the support block is made by two couplings. The couplings incorporate an easily remakeable seal, which is shielded and protected by the coupling itself. The couplings can be readily connected and disconnected under field conditions, numerous times, without requiring the sealing gaskets to be replaced. The couplings are robust and rigid to allow the entire manifold system to be self supporting.

Another aspect of the operation of pressure measuring installations is servicing the manifold system and the various connecting passages, especially the passages connecting the orifice taps to the manifold. The nature of certain process fluids is such that the internal passages, particularly at the orifice taps, may become clogged or plugged. The passages from the process fluid source to the pressure transmitter must be open and clear for the process fluid pressures to be accurately monitored. The present invention allows for the internal passages to be kept open and clear.

These passages are maintained by rodding. Rodding is an operational practice which involves pushing an appropriately sized rod through the passages to remove any clogs or debris. The support block, after it is isolated from the process by the block valves, is removed from the connecting couplings to allow access to the manifold passages through the process supply manifold. The connecting couplings have been designed to allow the easy attachment of a pressure retaining rodding tool. The rodding tool is then inserted through the coupling connectors and into the manifold passages. The passages can be rodded through the block valves and back to the orifice taps.

The known manifolds have the disadvantage that they cannot be rodded due to the complex, tortuous passageway of the conduits through the manifold. Prior art known to the present applicant includes U.S. Pat. No. 4,672,628 (Nimberger) which shows a pressure signal instrument and manifold having a modular structure. Viewed from the standpoint of the present invention, the transmitter is mounted on the manifold so that the rodding of the manifold would probably require removal of the transmitter exposing the inlet face to possible damage. The arrangement does not allow efficient and convenient flushing as it is not adapted to be quickly connected to a source of flushing liquid independent of the process fluid.

U.S. Pat. No. 4,938,246 (Conley et al.) shows that it is known to provide a rodding tool. U.S. Pat. No. 5,313,985 (Donner) shows that it is known to provide a modular assembly of manifolds.

SUMMARY OF THE INVENTION

It is an object of the present invention to improve pressure transmitter manifold systems by producing a manifold system which enables convenient servicing, particularly flushing, of the system when required, while at the same time allowing a convenient rodding of the system.

In general terms, the invention provides a valve manifold system comprising, in combination, a support block for supporting a process fluid pressure processing instrument and protecting an inlet section thereof, said block including a process fluid conduit means terminating, at one end portion thereof, at a process fluid inlet means and, at another portion thereof, at process fluid outlet means, said support block being compatible with an associated process fluid pressure processing instrument for fixedly securing the block to the instrument, said process fluid outlet means being adapted to sealingly engage process fluid inlet means of the instrument to conduct process fluid to such instrument. The combination further includes a process fluid supply manifold disposed upstream of said support block and including process fluid inlet port means, process fluid outlet port means and process fluid passageway means connecting said inlet port means with said outlet port means. Coupling conduit means of the system, having an upstream end portion and a downstream end portion, connects the support block to the manifold and defines a process fluid conduit between said manifold and said block. The inlet port means, said passageway means, said process fluid outlet port means and said connecting conduit means are all generally straight and co-axial with one another.

BRIEF DESCRIPTION OF THE DRAWINGS

The present invention will now be described by way of an exemplary embodiment, with reference to the accompanying diagrammatic, not-to-scale drawings, wherein.

DETAILED DESCRIPTION OF PREFERRED EMBODIMENTS

Figure 1:
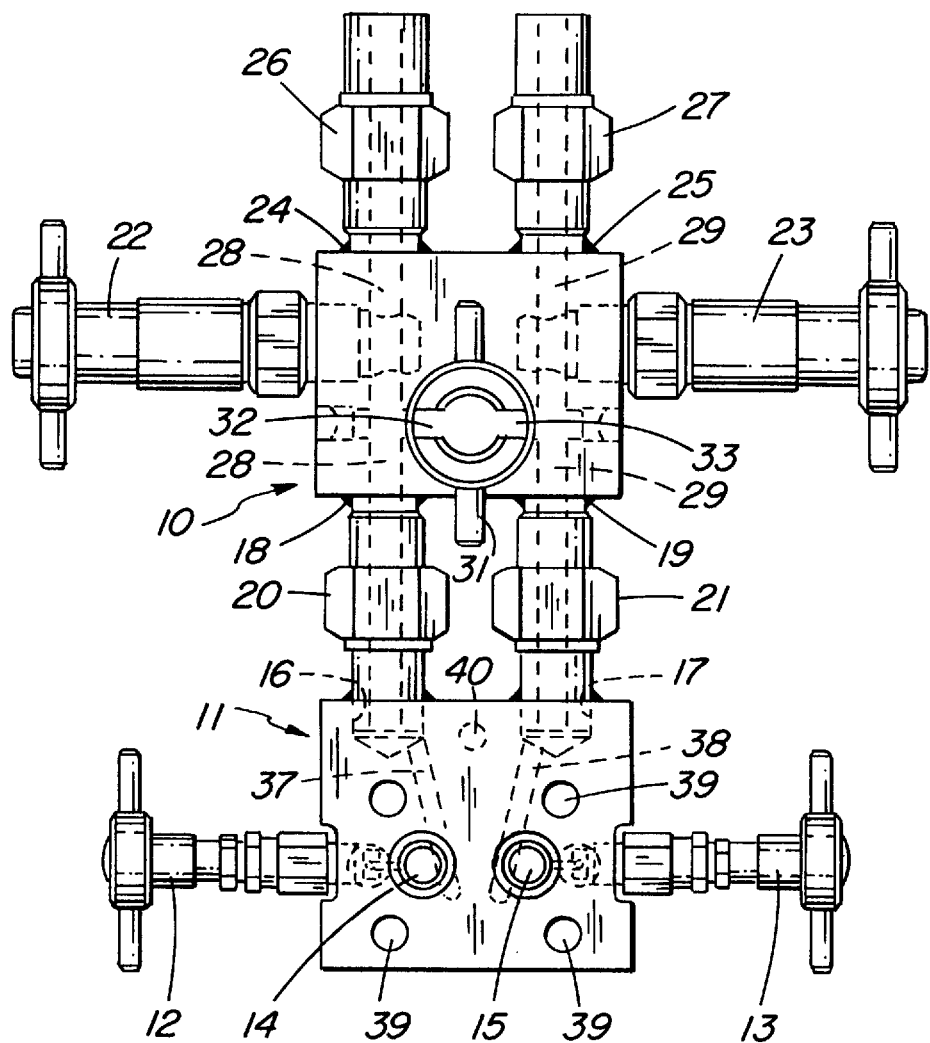
FIG. 1 is a diagrammatic plan view of the pressure transmitter manifold system of the present invention.
Figure 2:
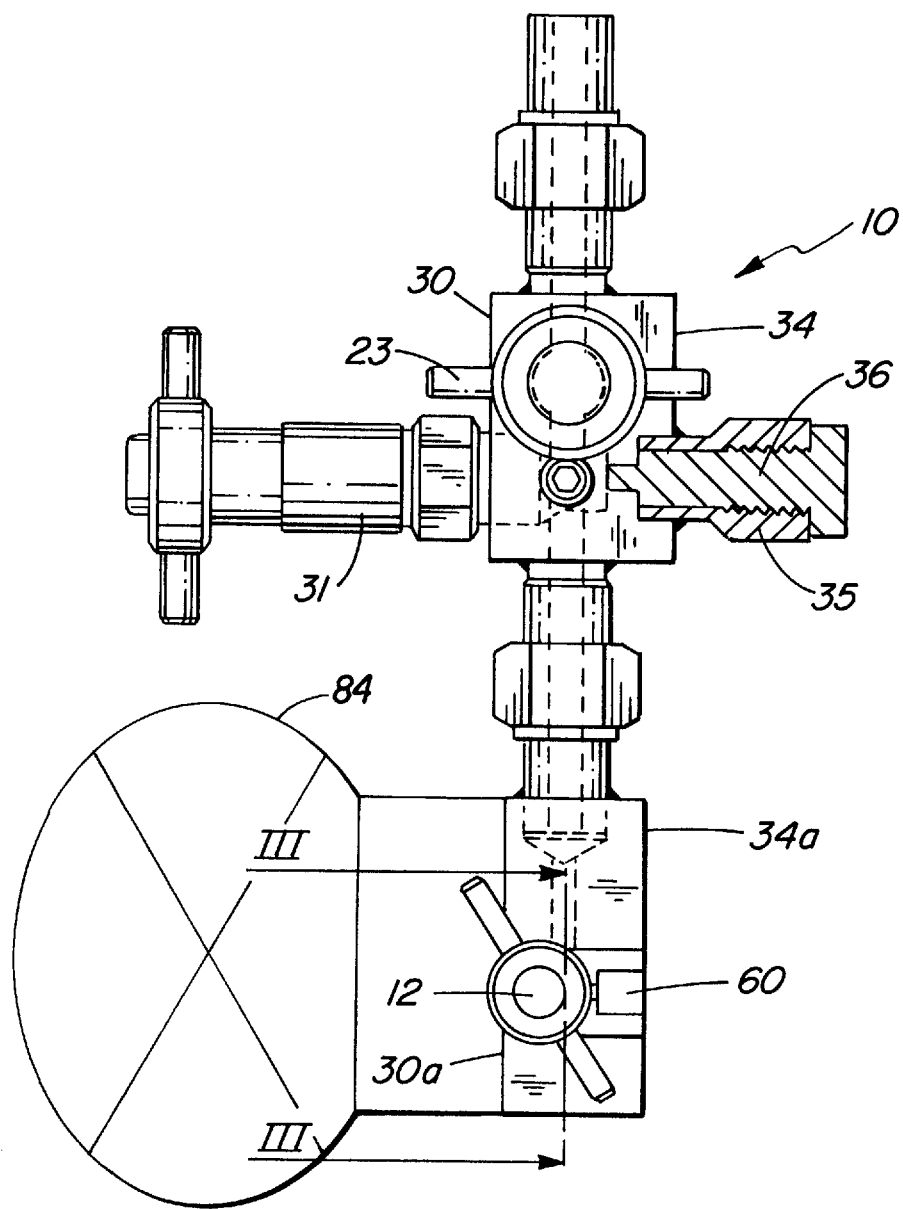
FIG. 2 is a side view, partly in section, of the system shown in FIG. 1.
Figure 3:
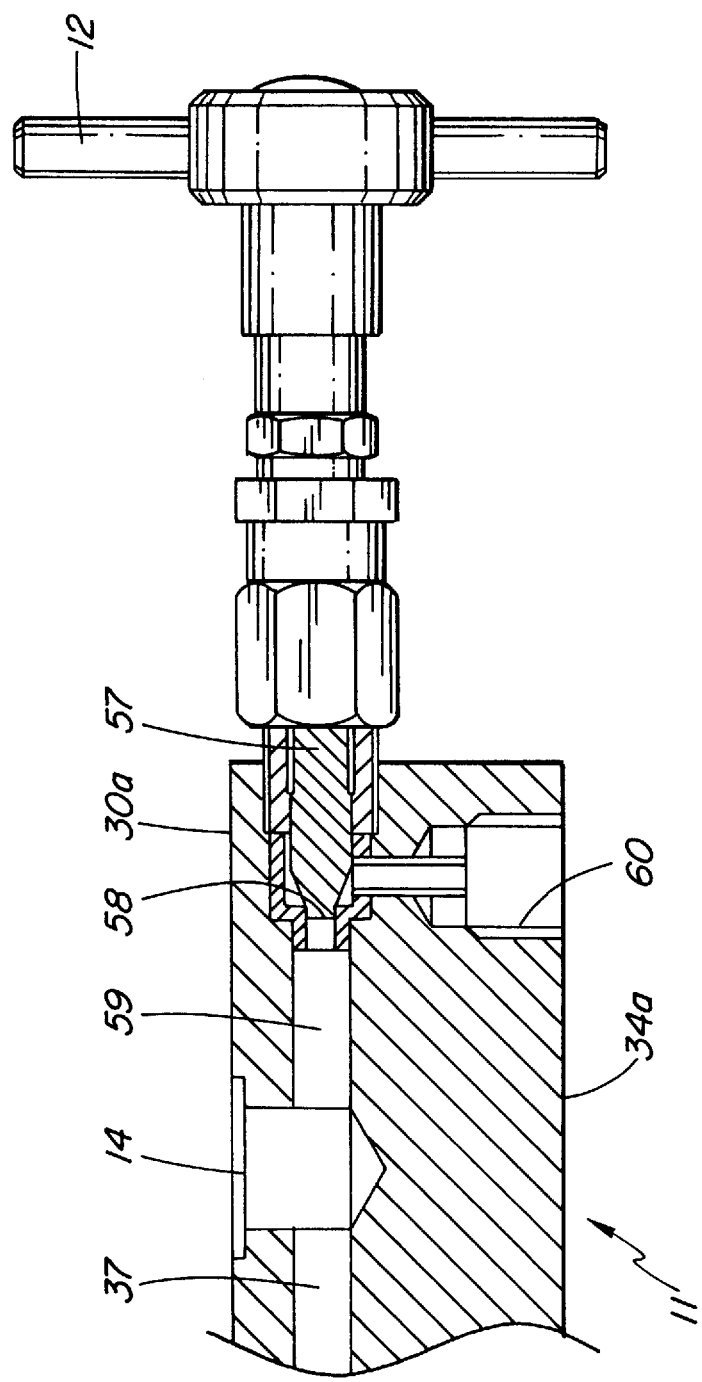
FIG. 3 is a partial sectional view, on enlarged scale, along the line III—III of FIG. 2.

Shown in FIGS. 1–3 is a first embodiment of a manifold system which is comprised of a 3-valve process fluid supply manifold 10 detachably interconnected with a transmitter support block. In the first embodiment, the support block is designated as a manifold 11.

The transmitter support block 11 includes two vent valves 12, 13. There are two outlet ports 14, 15 which serve the purpose of transmitting the process fluid to an associated device. For convenience, the process ports 14, 15 are hereafter referred to as to as high and low pressure transmitter discharge or outlet ports 14, 15. In the embodiment shown, they are compatible with inlets of a pressure transmitter 84 or other pressure processing apparatus, as is well known in the art. The block 11 further includes a high and low pressure process fluid inlets 16, 17. It should be borne in mind that throughout this specification, the reference to "high" and "low" pressure portions of the system is made strictly for convenience as the two are virtually identical in structure and their roles can easily be reversed. As is known, the pressure differential in the systems of this type is very low. Therefore, the reference to "high" or "low" pressure throughout this specification is to be read in this context and considered as being strictly a convenient distinction between a pair of virtually identical process fluid outlets, inlets or the like. The supply manifold 10 (which is adapted to operate with all three types of support blocks 11, 11a, 11b (described) likewise includes a high and low pressure outlet ports 18, 19 communicating, via a high pressure concentric coupling 20 and a low pressure concentric coupling 21, with the respective process fluid inlet 16 or 17.

Two block valves 22, 23 in the supply manifold 10 are adapted to selectively block or open the supply of a high and low pressure process fluid coming from high and low pressure process fluid inlet ports 24, 25 each of which is coaxial with the high and low pressure process fluid outlet ports 18, 19 at the opposite end of the supply manifold 10, respectively.

The process ports 24, 25 are coupled, via eccentric or concentric high and low pressure couplings 26, 27, with conduits (not shown) bringing the process fluid from the main process fluid pipe line (also not shown) the operative condition of which is being monitored.

The parallel arrangement of high and low pressure passageways 28, 29 extending between the ports 18–24, 19–25 provides sufficient space therebetween for locating on an upper surface 30 (FIG. 2) of a flush/equalizer valve (f/e valve) 31. The reference throughout this disclosure to the "upper" surface is for convenience only and can be reversed to a "lower" or "one side" reference if desired. The f/e valve 31 is a two-way valve which maintains equalizer passageway branches 32, 33 communicating with each other, or interrupting the communication between the two branches. The branches 32, 33 are in permanent communication with the portion of the passageways 28,29 downstream of the block valves 22, 23.

At the "lower" surface 34 of the supply manifold 10, a flushing fluid inlet port 35 is provided with a union for quick connection of the port 35 to a source (not shown) of the flushing fluid. A plug 36 is threaded in the union of port 35. The port 35 is adapted to allow inflow of the flushing fluid into the system and the f/e valve 31 controls the inlet of the fluid into the branches 32, 33 and from there to the downstream ends of passageways 28, 29 and on to 30 the support manifold 11.

A pair of short, convergent conduits 37, 38 bring the high and low pressure process fluid to the high and low pressure inlet ports 14, 15 provided in the "upper" mounting surface 30a of the block 11, compatible with the mounting flange of an associated pressure transmitter (not shown). The term "upper mounting surface" is to be interpreted in the same way as that of the "upper" surface 30, i.e. being used merely for convenience and not indicating a preferred orientation of the surface. The same applies to the "lower" surface 34a which is so designated only because the embodiment shown has the surface generally parallel with and opposed to the "upper" surface 30a.

The vent valves 12, 13 allow venting of the conduits 37, 38 up to an immediate vicinity of the pressure transmitter (not shown), and thus also of passageways 28, 29. The particular exemplary arrangement of the vent valves is apparent from FIG. 2 in conjunction with FIG. 3. The vent valve 12 is provided with a valve member 57 compatible with a valve seat 58 for selective closing of the fluid communication between an extension or vent conduit 59 and the vent discharge port 60 provided in the "lower" surface 34a. The arrangement of the vent valve 13 is generally the same and therefore does not have to be described in detail.

Prior to removing the support block from the manifold system, the support block must be isolated and depressurized. This is effected by utilizing the vent valves located in the support block. The vented process fluid exits the manifold system through ¼" NPT outlet ports. These ports allow for the capture of process fluids. In certain applications, the process fluids are of such a toxic nature as to pose a danger to operators or the environment. The manifold system includes a controlled access port for the introduction of flushing fluids. These flushing fluids remove or neutralize the toxic process fluids, permitting an operator to safely remove the support block. The valve required to control the flushing fluids has been integrated with the equalizer valve, thereby incorporating two separate functions into a single valve which reduced the number of separate individual valves required, reduces the number and complexity of the internal passages and allows for economic advantages in the manufacture of the manifold system.

The vent valves 12, 13 also allow the manipulation of the flow of pressurized flushing fluid coming from the port 35 via the associated passageways and conduits as described, to allow selective flow (with block valves 22, 23 closed) of the flushing fluid in the desired direction.

The block 11 is provided with four mounting holes 39 for securing the transmitter to the block 11, and at least one mounting hole 40 for fixed securement of the block 11 to a solid support (not shown).

The couplings 20, 21 provide—apart from the function as conduits between the supply manifold 10 and block 11—a support mount holding the supply manifold 10 rigidly in place relative to the solid support (not shown) to which the manifold 11 is secured through the mounting hole 40 as mentioned. To further enhance the serviceability of the manifold system, the block valves and the equalizer/flushing valve incorporate a replaceable seat design. The seats may be either metal seats or soft seats, depending on the application and specific process conditions.

The flushing of the system is thus very convenient. It requires merely the connecting of the port 35 to a source of pressurized flushing fluid. The flow of the flushing liquid is controlled by manipulation of the existing valves. When it is desired to service, for instance, to rod the system, which operation is mainly concerned with the rodding of conduits and passageways all the way from the couplings 20, 21 to and including the couplings 26, 27, the couplings 20, 21 are released and the entire support block 11 removed, thus opening the system from the couplings 20, 21 all the way through the manifold 10 and into the upstream extremes of the couplings 26, 27. It is to be appreciated that in most industrial applications, the rodding is particularly desirable upstream of the branches 32, 33 as these parts do-not benefit from the cleaning effect of the flushing when the system is being flushed. Therefore, they tend to become obstructed by sediments from the process fluid more readily than the flushed downstream end of the system. When the rodding or other maintenance operation is finished, the re-connecting of the support block 11 to the supply manifold 10 is a relatively easy task due to the support mount hole 40 in the support block 11. Thus, the block 11 assumes exactly the same position as it had before, relative to the plane defined by the axes of the ports 16–18 and 17–19. The ease of disassembly and assembly of the components of the system can also be utilized when other maintenance tasks are to be carried out.

The second embodiment of the transmitter support block 11a (FIG. 4) is designed for applications where two pressure transmitters are required, one for the absolute pressure, the other for the relative pressure. The block 11a is fluidly connected to the system previously described, namely to the supply manifold 10, This is signified by using, in FIG. 4, reference numbers 10, 16–19 and 31 for the corresponding parts of the system previously described. Thus, for convenience, reference number 16 designates a "high pressure" inlet and reference number 17 a "low pressure" inlet.

The high pressure inlet 16 is fluidly connected to a first conduit 41 which branches into a first branch 42 and a second branch 43. The first branch 42 extends to a first "high pressures" transmitter discharge or outlet port 44 and then continues, via an extension vent passageway 45 (also referred to as a "vent conduit"), to a first high pressure vent valve 46 which is arranged to selectively open the passageway 42, 45 and thus 41 to the atmosphere.

The second branch 43 similarly extends to a second "high pressure" transmitter discharge or outlet port 47 and then continues, via an extension conduit 48 (also referred to a "vent conduit"), to a second high pressure vent 30 valve 49 which is arranged to selectively open the conduit 43, 48 and 41 to the atmosphere. Of course, either one of the valves 46, 49, when open to the atmosphere, also exposes to the atmosphere the opposed branch 43 or 42 of the conduit 41.

The "low pressure" inlet port 17 communicates with a first branch of a V-shaped conduit 50. The second branch of the conduit 50 communicates with a "low pressure" transmitter discharge or outlet port 51 and —through a short coaxial extension or vent conduit 52—with a "low pressure" vent valve 53 which is arranged to selectively open the conduit 50, 52 and thus the low pressure outlet port 51 to the atmosphere.

The first "high pressure" outlet port 44 is located within a first mounting section 54 which includes four mounting holes 55. The first mounting section 54 and its mounting holes 55 are compatible with the mounting flange of the body of an absolute pressure transmitter (not shown). As is well known, such transmitter only has one process fluid inlet as opposed to a transmitter used in transmitting a relative value obtained from two inlets. The second "high pressure" outlet port 47 and the "low pressure" outlet port 51 are disposed within a second mounting section 54a and four transmitter mounting holes 55a are provided. The arrangement is thus functionally similar to that of the mounting face 30a of the manifold 11 described above.

Figure 4:
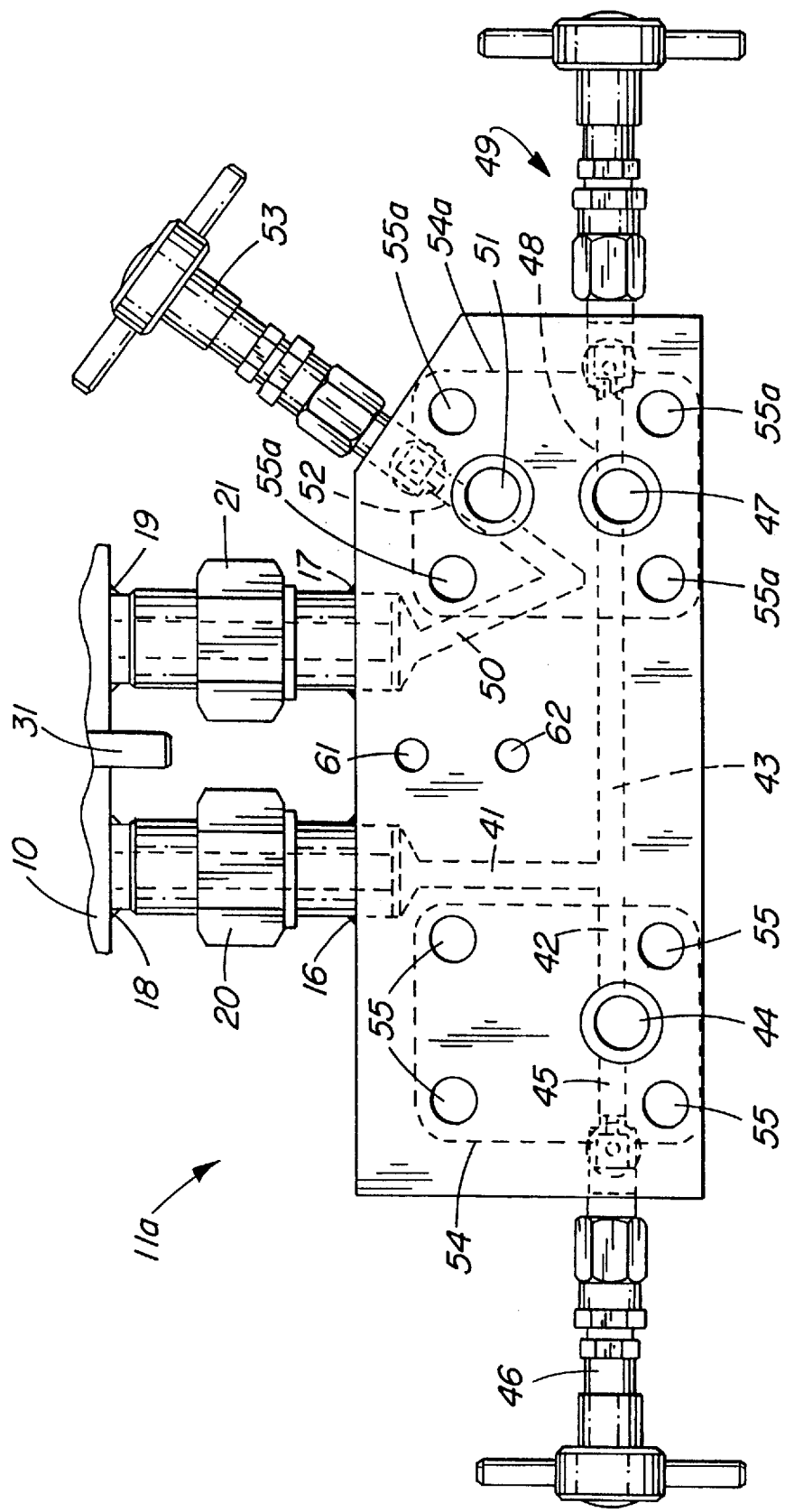
FIG. 4 is an enlarged plan view, similar to that of FIG. 1 but showing a second embodiment of the transmitter mounting portion of the system.

FIG. 4 further shows two mounting holes 61, 62 which serve the same purpose as the mounting hole 40 mentioned above, namely to secure the block 11a to a solid support (not shown).

As in the first embodiment of the block 11, reference number 16 designates a high pressure inlet and reference number 17 the low pressure inlet. When it is desired to service, for instance, to rod the system, the couplings 20, 21 are released and the entire block 11a removed, thus opening the system from the ports 18, 19 all the way through the manifold 10 and into the upstream extremes of the couplings 26, 27.

When the rodding or other maintenance operation is finished, the reconnecting of the support block 11a is a relatively easy task due to the support mount holes 61, 62 in the block 11a. Thus, the block 11a assumes exactly the same position as it had before, relative to the plane defined by the axes of the ports 16–18 and 17–19.

Figure 5:
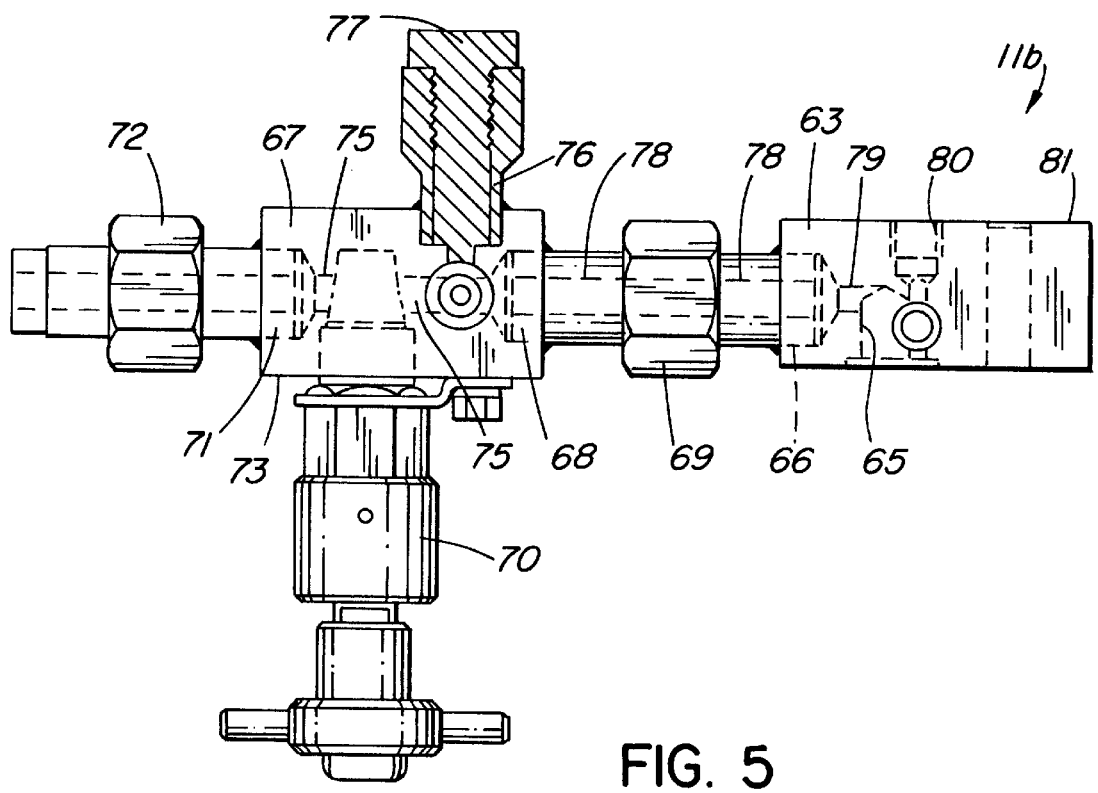
FIG. 5 is a side view with certain parts omitted of a third embodiment of the invention used in absolute pressure measurements or transmissions.
Figure 6:
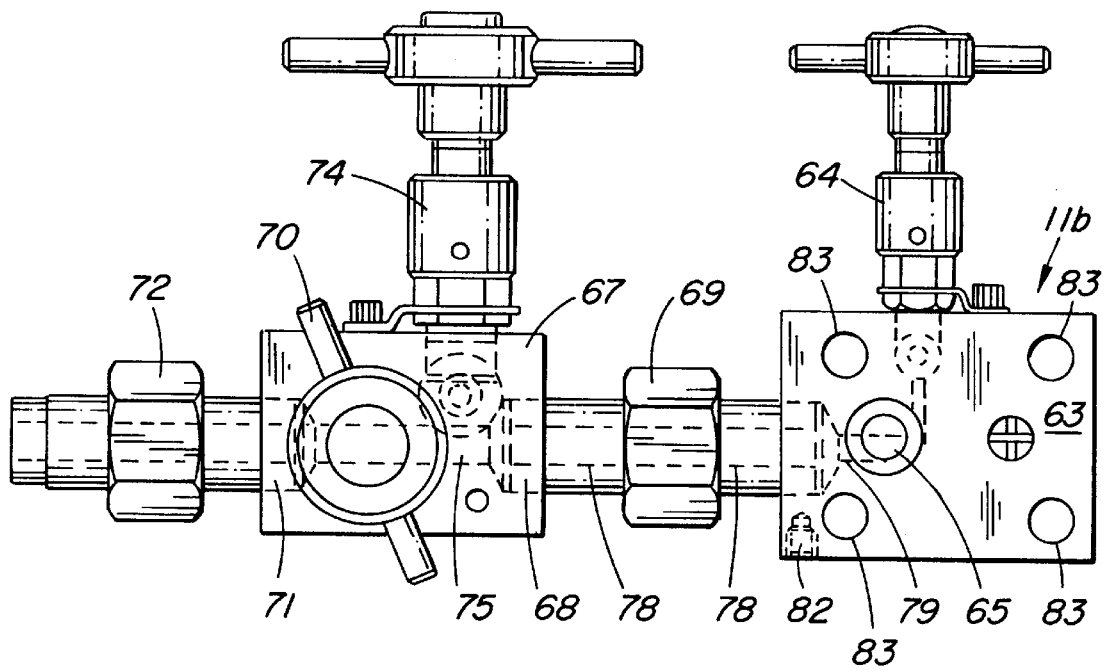
FIG. 6 is a plan view of FIG. 5.

FIGS. 5 and 6 show a third embodiment of the valve manifold system including a support block 11b and developed for applications where only a single process fluid inlet is required, The transmitter support block 63 includes a vent valve 64. An outlet port 65 serves the purpose of transmitting the process fluid to an associated pressure transmitter (not shown). The block 63 further includes a process fluid inlet port 66. The associated supply manifold 67 includes an outlet port 68 communicating, via a concentric coupling 69, with the inlet port 66.

A block valve 70 mounted in a face 73 (FIG. 5) of the body of the supply manifold 67 is adapted to selectively block or open the supply of pressure process fluid coming from a process fluid inlet port 71 which is coaxial with the outlet port 68 at the opposite end of the body of the supply manifold section 67.

The process fluid inlet port 71 is fluidly coupled, via an eccentric or concentric coupling 72, with a pipe line (not shown) the operative condition of which is being monitored.

A flush valve 74 (shown in FIG. 6 but deleted from FIG., 5 for clarity) selectively controls fluid communication between the portion of the passageway 75 downstream of the block valve 70 and a flushing fluid inlet port 76 which is provided with a union for quick connection of the port 76 to a source (not shown) of the flushing fluid. A plug 77 is threaded in the union of the port 76. As in the first and second embodiments, the port 76 is adapted to allow an inflow of the flushing fluid into the system and the flushing valve 74 controls the inlet of the fluid into the part of the passageway 75 downstream of the block valve 70, through the conduit 78 in the coupling 69, then into the conduit 79 and via the vent valve 64 (shown in FIG. 6 but not FIG. 5) to the vent outlet port 80 disposed in the face 81 of the body of the support manifold section 63.

The short vent conduit 79, of course, mainly serves the purpose of bringing the process fluid to the outlet port 66 provided in the "lower" mounting surface (as viewed in FIG. 5) of the block 63. The outlet port 65 is compatible with the mounting flange of an associated pressure transmitter (not shown).

The vent valve 64 allows venting of the passageways and conduits 75, 78, 79 up to an immediate vicinity of the pressure transmitter (not shown). The particular arrangement of the vent valve 64 is similar to the arrangement of the vent valve 12 described above in conjunction with FIG. 3.

The block 11b is provided with four mounting holes 83 for securing the transmitter to the block 11b, and at least one mounting hole 82 for fixed securement of the block 11b to a solid support (not shown).

The coupling 69 provides—apart from the function as an extension of the conduits between the manifold 67 and blocks 63—a support mount holding the supply manifold 67 rigidly in place relative to the solid support (not shown) to which the support block 63 is normally secured using the threaded mounting bore 82 (FIG. 6) or some other arrangement as may be required by the conditions on site.

As in the previously described embodiments, the flushing of the system is very convenient. With a source of flushing liquid connected to the unplugged port 76, it requires merely the connecting of the port 76 to the manifold system by manipulation of the valves 74, 64. The blocking valve 70, of course, remains closed during the flushing operation.

When it is desired to service, for instance, to rod the system, the coupling 69 is released and the entire block 63 removed, thus opening the rest of the system from the port 68 all the way through the supply manifold 67 and into the upstream extreme of the coupling 72. As mentioned, in most industrial applications, the rodding is particularly desirable upstream of the point where the flushing valve 74 is active in the passageways of the system.

When the rodding or other maintenance operation is finished, the reconnecting of the block 63 is a relatively easy task due to the support mount hole 82 in the block 63. Thus, the block 63 assumes the same position as it had before. As mentioned above, the ease of disassembly and assembly of the components of the system can also be utilized when other maintenance tasks are to be carried out.

The manifold system is fully rated to 6,000 psi. The replaceable seat, non rotating stem design of the valve are capable of bubble tight shutoff of 3,000 psi of nitrogen gas at 1,000° F.

There are two distinct advantages incorporated into the design of this manifold system to improve transmitter accuracy and response.

Firstly, the manifold has been designed to close couple to orifice plate taps and to be oriented horizontally. This manifold system, as noted above, has been designed to connect directly to coplanar style pressure transmitters, without the need for any intermediate adapters or connection flanges. The combination of the horizontal orientation of the manifold system and the direct connection of the pressure transmitter allows the transmitter process isolator foils to be located in very close proximity, approximately ½", to the axis of the horizontal orifice plate taps. This minimal distance between the tap axis and the isolator foils improves the accuracy of the transmitter readings and the response time.

Secondly, the large straight bores allow for an unimpeded straight line path for the process fluids from the orifice taps to the transmitter process isolator foils.

Those skilled in the art will readily appreciate that the gist of the invention is in combining two manifolds into a unit such that when there is need for maintenance or cleaning, the pressure transmitter or transmitters can be removed together with the support block 11, 11a, 11b, the instrument or the manifold system serviced and the support manifold then placed back in operation after rodding of both manifolds, without the need of time consuming realignment of the elements and without the danger or damage to the pressure transmitter upon removal of same from the five valve manifold, as it is required in prior art.

The embodiments of the invention described above can be modified to a greater or lesser degree without departing from the scope of the present invention. Accordingly, I wish to protect by Letters Patent which may issue on this application all such embodiments as fairly fall within the scope of my contribution to the art.

I claim:

1. A valve manifold system comprising, in combination:
   (a) a support block for supporting a process fluid pressure processing instrument on a face of said support block and protecting an inlet means of said instrument when said support block is separated from a process fluid supply manifold, said block including at least one process fluid conduit means terminating, at one end portion thereof, at a process fluid inlet means and, at the other end portion thereof, at process fluid outlet means at said face, said support block being compatible with an associated process fluid pressure processing instrument for fixedly securing the block to the instrument, said process fluid outlet means sealingly engaging process fluid inlet means of the instrument to conduct process fluid to such instrument inlet means;

(b) a process fluid supply manifold disposed upstream of said block and including at least one process fluid inlet port means, at least one process fluid outlet port means and at least one process fluid passageway means connecting said inlet port means with said outlet port means;

(c) at least one coupling conduit means having an upstream end portion and a downstream end portion, said at least one coupling conduit means connecting the support block to the manifold and defining a process fluid conduit means between said manifold and said block;

(d) the inlet port means of each said passageway means, an associated one of the process fluid outlet port means and an associated one of said coupling conduit means being all generally straight and co-axial with one another and generally parallel to said face of said support block; whereby, when said support block is coupled to said process fluid supply manifold and said co-axis is coaxial with a central axis of a horizontal tap of a pressurized fluid supply line, the inlet means of said instrument is vertically spaced from said axis of the horizontal tap by less than the thickness of said support block.

2. The valve manifold system of claim 1, wherein said manifold comprises flushing fluid inlet means and a flushing valve means for selectively opening or closing fluid flow between said flushing fluid inlet means and said at least one process fluid passageway means at a flushing fluid inlet point disposed between said inlet port means and said outlet port means.

3. The valve manifold system of claim 2, wherein said manifold comprises blocking valve means for selectively blocking process fluid flow between said process fluid inlet port means and said process fluid outlet port means at a point of said at least one fluid passageway means disposed between said flushing fluid inlet point and said process fluid inlet port means.

4. The valve manifold system of claim 3, wherein said support block comprises a vent conduit and is equipped with a vent valve for selectively closing or opening fluid flow through said vent conduit, said vent conduit communicating said process fluid outlet means with a vent outlet of said block.

5. The valve manifold system of claim 2, wherein (a) said at least one process fluid conduit means is comprised of two process fluid conduits, each having its own process fluid inlet and process fluid outlet;

(b) said at least one process fluid passageway means of the manifold is comprised of two process fluid passageways, each provided with a blocking valve;

(c) said at least one coupling conduit means is comprised of two coupling conduits, each for connecting one of the process fluid conduits of the block with one of the process fluid passageways of the manifold;

(d) said flushing fluid inlet means is a single flushing fluid inlet and said flushing valve means is a single flushing valve disposed in a flushing conduit communicating the flushing fluid inlet with both said process fluid passageways.

6. The valve manifold system of claim 5, wherein said block is adapted for fixedly supporting a single process fluid pressure processing instrument having dual process fluid inlets.

7. The valve manifold system of claim 5, wherein said block is shaped for fixedly supporting two process fluid pressure processing instruments.

8. The valve manifold system of claim 7, wherein the block includes two process fluid outlets both communicating with a first one of the process fluid inlets, each of said process fluid outlets also communicating one with each of said two process fluid pressure processing instruments.

9. The valve manifold system of claim 8, wherein the block further includes a third process fluid outlet communicating with a second one of the process fluid inlets, said third process fluid outlet communicating with only one of said instruments.

10. The valve manifold system of claim 9, wherein each of said process fluid outlets communicates, through a vent passageway provided with a vent valve, with a vent discharge port provided in the block.

11. The valve manifold system of claim 10, comprising three vent passageways, each provided with a separate vent valve.

12. The valve manifold system of claim 1 for use with a single instrument for processing absolute pressure of the process fluid, wherein:

(a) said at least one process fluid conduit means is a single process fluid conduit;

(b) said at least one process fluid passageway means of the manifold is a single process fluid passageway provided with a blocking valve;

(c) said at least one coupling conduit means is a single coupling conduit adapted for releasably connecting the process fluid conduit means of the block with the process fluid passageway of the manifold.

13. The valve manifold system of claim 12, wherein said process fluid supply manifold comprises a flushing fluid inlet and a flushing valve selectively communicating said flushing fluid inlet with said process fluid passageway means at a flushing fluid inlet point disposed between said process fluid inlet port means and said outlet port means.

14. The valve manifold system of claim 13, wherein said process fluid supply manifold comprises a block valve for selectively blocking fluid flow between said process fluid inlet port means and said process fluid outlet port means at a point of said fluid flow passageway disposed between said flushing fluid inlet point and said process fluid inlet port means.

15. The valve manifold system of claim 14, wherein said block comprises a vent conduit equipped with a vent valve for selectively closing or opening fluid flow through said vent conduit, said vent conduit communicating said process fluid outlet means of said block with a vent outlet provided in said block.

16. A valve manifold for use in a valve manifold system comprising a block for supporting and protecting a process fluid pressure processing instrument, said block being provided with at least one process fluid conduit means to bring process fluid to the instrument, and with vent means operatively connected to a vent valving means for selectively venting said at least one process fluid conduit means, said valve manifold also comprising:

(a) a process fluid supply manifold coupled to, and upstream of, said block and comprising at least two process fluid inlet port means, at least two process fluid outlet port means and a process fluid passageway means connecting each of said inlet port means with said outlet port means;

(b) each inlet port means including an inlet port, an associated one of said passageway means and an associated one of said outlet port means, said inlet port, the associated one of said passageway means and the associated one of said outlet port means being all generally straight and co-axial with one another;

(c) flushing fluid inlet means and a single flushing valve means for selectively opening or closing fluid flow between said flushing fluid inlet means and each of said process fluid passageway means at a flushing fluid inlet point disposed between said inlet port means and said outlet port means; and (d) blocking valve means for selectively blocking fluid flow between said process fluid inlet port means and said process fluid outlet port means at a point of said fluid flow passageway means disposed between said flushing fluid inlet point and said process fluid inlet port means; wherein said single flushing fluid valve is structured so as to constitute an equalizer valve between said two generally straight process fluid passageways.

17. The manifold of claim 16, wherein:

(a) said process fluid passageway means is comprised of two generally straight process fluid passageways generally parallel with each other, each having its own process fluid inlet port and process fluid outlet port;

(b) each said process fluid passageway is provided with a blocking valve; and (c) said flushing fluid inlet means is a single flushing inlet port and said flushing valve means is a single flushing fluid valve disposed in a flushing fluid passageway for communicating flushing fluid inlet port with both said process fluid passageways.

18. The manifold of claim 5 further comprising at least one equalizer valve fluidly coupled to each of said two process fluid passageways.

19. The valve manifold of claim 18, wherein said equalizer valve also functions as said single flushing valve.

20. The valve manifold system of claim 1, further comprising in combination a process fluid pressure processing instrument supported on a face of said support block.

* * * * *